United States Patent
Capata et al.

(10) Patent No.: US 8,633,999 B2
(45) Date of Patent: Jan. 21, 2014

(54) METHODS AND APPARATUSES FOR FOREGROUND, TOP-OF-THE-HEAD SEPARATION FROM BACKGROUND

(75) Inventors: Adrian Capata, Bucuresti (RO); Mihai Ciuc, Bucuresti (RO); Adrian Zamfir, Bucuresti (RO); Alexandru Drimbarean, Galway (IE)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 315 days.

(21) Appl. No.: 12/790,594

(22) Filed: May 28, 2010

(65) Prior Publication Data

US 2011/0050938 A1    Mar. 3, 2011

Related U.S. Application Data

(60) Provisional application No. 61/182,625, filed on May 29, 2009.

(51) Int. Cl.
| | |
|---|---|
| H04N 5/262 | (2006.01) |
| H04N 5/235 | (2006.01) |
| H04N 5/228 | (2006.01) |
| H04N 5/222 | (2006.01) |
| G06K 9/00 | (2006.01) |
| G06K 9/46 | (2006.01) |
| G06K 9/66 | (2006.01) |
| G06K 9/62 | (2006.01) |

(52) U.S. Cl.
USPC ........ 348/239; 348/222.1; 348/370; 382/181; 382/190; 382/225

(58) Field of Classification Search
USPC ............ 348/370–371, 222.1; 382/181–231
See application file for complete search history.

(56) References Cited

U.S. PATENT DOCUMENTS

| 4,299,464 A | 11/1981 | Cushman |
| 4,448,510 A | 5/1984 | Murakoshi |

(Continued)

FOREIGN PATENT DOCUMENTS

| EP | 1128316 A1 | 8/2001 |
| EP | 1296510 A2 | 3/2003 |

(Continued)

OTHER PUBLICATIONS

Viola, Paul, et al., "Rapid Object Detection using a Boosted Cascade of Simple Features", IEEE, 2001, 8 pages.

(Continued)

*Primary Examiner* — Sinh Tran
*Assistant Examiner* — Christopher K Peterson
(74) *Attorney, Agent, or Firm* — Hickman Palermo Truong Becker Bingham Wong LLP (57) ABSTRACT

Foreground and background regions of a digital image of a scene are distinguished from each other automatically. Foreground objects are identified in a binary image map that distinguishes between foreground pixels and background pixels. From the foreground objects, a primary foreground object is identified. Within the identified primary foreground object, a head region of the primary foreground object is located. Within the head region, patterns of foreground pixels and background pixels that are indicative of a head crown region are identified. Within the head crown region, pixels identified as background pixels that actually show portions of the primary foreground object are converted to foreground pixels, thus improving the accuracy of the binary image map.

29 Claims, 6 Drawing Sheets

(56) References Cited

U.S. PATENT DOCUMENTS

| | | |
|---|---|---|
| 5,432,863 A | 7/1995 | Benati et al. |
| 5,500,671 A | 3/1996 | Andersson et al. |
| 5,748,764 A | 5/1998 | Benati et al. |
| 5,751,836 A | 5/1998 | Wildes et al. |
| 5,802,220 A | 9/1998 | Black et al. |
| 5,805,720 A | 9/1998 | Suenaga et al. |
| 6,072,903 A | 6/2000 | Maki et al. |
| 6,198,505 B1 | 3/2001 | Turner et al. |
| 6,246,790 B1 | 6/2001 | Huang et al. |
| 6,278,491 B1 | 8/2001 | Wang et al. |
| 6,335,990 B1 | 1/2002 | Chen et al. |
| 6,407,777 B1 | 6/2002 | DeLuca |
| 6,456,737 B1 | 9/2002 | Woodfill et al. |
| 6,636,694 B1 | 10/2003 | Misumi et al. |
| 6,661,907 B2 | 12/2003 | Ho et al. |
| 6,747,690 B2 | 6/2004 | Molgaard |
| 6,823,086 B1 | 11/2004 | Dolazza |
| 6,895,112 B2 | 5/2005 | Chen et al. |
| 7,072,525 B1 | 7/2006 | Covell |
| 7,099,510 B2 | 8/2006 | Jones et al. |
| 7,130,453 B2 | 10/2006 | Kondo et al. |
| 7,176,975 B2 | 2/2007 | Matsunaga et al. |
| 7,315,631 B1 | 1/2008 | Corcoran et al. |
| 7,352,394 B1 | 4/2008 | DeLuca et al. |
| 7,403,643 B2 | 7/2008 | Ianculescu et al. |
| 7,403,654 B2 | 7/2008 | Wu et al. |
| 7,551,755 B1 | 6/2009 | Steinberg et al. |
| 7,567,707 B2 | 7/2009 | Willamowski et al. |
| 7,630,006 B2 | 12/2009 | DeLuca et al. |
| 7,692,696 B2 | 4/2010 | Steinberg et al. |
| 7,783,085 B2 | 8/2010 | Perlmutter et al. |
| 7,804,983 B2 | 9/2010 | Steinberg et al. |
| 7,903,870 B1 | 3/2011 | Budagavi |
| 7,995,239 B2 | 8/2011 | Yonaha |
| 7,995,855 B2 | 8/2011 | Albu et al. |
| 8,005,268 B2 | 8/2011 | Steinberg et al. |
| 8,155,468 B2 | 4/2012 | Albu et al. |
| 8,212,897 B2 | 7/2012 | Steinberg et al. |
| 8,254,674 B2 | 8/2012 | Nanu et al. |
| 8,265,348 B2 | 9/2012 | Steinberg et al. |
| 8,265,388 B2 | 9/2012 | Nanu et al. |
| 2001/0012063 A1 | 8/2001 | Maeda |
| 2001/0038714 A1 | 11/2001 | Masumoto et al. |
| 2002/0034337 A1 | 3/2002 | Shekter |
| 2002/0080261 A1 | 6/2002 | Kitamura et al. |
| 2002/0102024 A1 | 8/2002 | Jones et al. |
| 2002/0136450 A1 | 9/2002 | Chen et al. |
| 2002/0154793 A1 | 10/2002 | Hillhouse et al. |
| 2003/0044070 A1 | 3/2003 | Fuersich et al. |
| 2003/0071908 A1 | 4/2003 | Sannoh et al. |
| 2003/0086134 A1 | 5/2003 | Enomoto |
| 2003/0095197 A1 | 5/2003 | Wheeler et al. |
| 2003/0118218 A1 | 6/2003 | Wendt et al. |
| 2003/0138143 A1 | 7/2003 | Noguchi |
| 2003/0184671 A1 | 10/2003 | Robins et al. |
| 2004/0042659 A1 | 3/2004 | Guo et al. |
| 2004/0213478 A1 | 10/2004 | Chesnokov |
| 2004/0264780 A1 | 12/2004 | Zhang et al. |
| 2005/0013506 A1 | 1/2005 | Yano |
| 2005/0147304 A1* | 7/2005 | Nagahashi et al. ........... 382/190 |
| 2005/0226484 A1 | 10/2005 | Basu et al. |
| 2005/0226509 A1 | 10/2005 | Maurer et al. |
| 2005/0249416 A1 | 11/2005 | Leue et al. |
| 2005/0259185 A1 | 11/2005 | Kim et al. |
| 2006/0039690 A1 | 2/2006 | Steinberg et al. |
| 2006/0072815 A1 | 4/2006 | Wu et al. |
| 2006/0110014 A1 | 5/2006 | Philomin et al. |
| 2006/0204052 A1 | 9/2006 | Yokouchi |
| 2006/0257047 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0147820 A1 | 6/2007 | Steinberg et al. |
| 2007/0172126 A1 | 7/2007 | Kitamura |
| 2007/0177817 A1 | 8/2007 | Szeliski et al. |
| 2007/0189609 A1 | 8/2007 | Ito et al. |
| 2007/0195996 A1 | 8/2007 | Kitamura |
| 2007/0196019 A1 | 8/2007 | Yamaguchi |
| 2007/0216777 A1 | 9/2007 | Quan et al. |
| 2007/0263119 A1 | 11/2007 | Shum et al. |
| 2007/0263928 A1 | 11/2007 | Akahori et al. |
| 2007/0269108 A1 | 11/2007 | Steinberg et al. |
| 2008/0025576 A1 | 1/2008 | Li et al. |
| 2008/0112599 A1 | 5/2008 | Nanu et al. |
| 2008/0205712 A1 | 8/2008 | Ionita et al. |
| 2008/0219517 A1 | 9/2008 | Blonk et al. |
| 2008/0226273 A1 | 9/2008 | Kaku |
| 2008/0253651 A1 | 10/2008 | Sagawa |
| 2008/0309617 A1 | 12/2008 | Kong et al. |
| 2008/0310759 A1 | 12/2008 | Liu et al. |
| 2009/0080795 A1 | 3/2009 | Yano |
| 2009/0087099 A1 | 4/2009 | Nakamura |
| 2009/0185753 A1 | 7/2009 | Albu et al. |
| 2009/0190803 A1 | 7/2009 | Neghina et al. |
| 2009/0297044 A1 | 12/2009 | Kokumai |
| 2009/0303342 A1 | 12/2009 | Corcoran et al. |
| 2010/0053362 A1 | 3/2010 | Nanu et al. |
| 2010/0053367 A1 | 3/2010 | Nanu et al. |
| 2010/0053368 A1 | 3/2010 | Nanu et al. |
| 2010/0054592 A1 | 3/2010 | Nanu et al. |
| 2011/0044524 A1 | 2/2011 | Wang et al. |
| 2011/0044553 A1 | 2/2011 | Coupe et al. |
| 2011/0058060 A1 | 3/2011 | Bigioi et al. |
| 2011/0102643 A1 | 5/2011 | Nanu et al. |
| 2011/0105194 A1 | 5/2011 | Wang et al. |
| 2011/0158547 A1 | 6/2011 | Petrescu |
| 2011/0279700 A1 | 11/2011 | Steinberg et al. |
| 2012/0014600 A1 | 1/2012 | Nanu et al. |
| 2012/0019683 A1 | 1/2012 | Susanu |
| 2012/0083294 A1 | 4/2012 | Bray et al. |

FOREIGN PATENT DOCUMENTS

| | | |
|---|---|---|
| EP | 1748378 A1 | 1/2007 |
| EP | 1 858 255 A1 | 11/2007 |
| EP | 1839435 B1 | 4/2009 |
| EP | 2158754 A1 | 3/2010 |
| EP | 2249556 A2 | 11/2010 |
| EP | 2249556 A3 | 9/2011 |
| JP | 10-233929 A | 9/1998 |
| JP | 2003111041 | 4/2003 |
| JP | 2003-179807 A | 6/2003 |
| JP | 2004005694 | 1/2004 |
| JP | 2005/078158 A | 3/2005 |
| JP | 2005-164475 A | 6/2005 |
| JP | 2005/165984 A | 6/2005 |
| JP | 2005208760 | 8/2005 |
| JP | 2006/072770 A | 3/2006 |
| JP | 2006072770 A1 | 3/2006 |
| JP | 2006-318103 A | 11/2006 |
| JP | 2006-319534 A | 11/2006 |
| JP | 2006-319870 A | 11/2006 |
| JP | 2006-350498 A | 12/2006 |
| JP | 2007/047965 A | 2/2007 |
| JP | 2007/241424 A | 9/2007 |
| JP | 2007-006182 A | 11/2007 |
| JP | 2008/005081 A | 1/2008 |
| KR | 10-2004-0034342 A | 4/2004 |
| KR | 10-2005-0041772 A | 5/2005 |
| KR | 10-2006-0003666 A | 1/2006 |
| WO | 94/26057 A | 11/1994 |
| WO | 2005/076217 A2 | 8/2005 |
| WO | WO2006/095860 A | 9/2006 |
| WO | 2007/060980 A1 | 5/2007 |
| WO | 2012/041892 A1 | 5/2007 |
| WO | 2007/073781 A1 | 7/2007 |
| WO | 2007/097777 A1 | 8/2007 |
| WO | 2007/106117 A2 | 9/2007 |
| WO | 2007/106117 A3 | 12/2007 |
| WO | 2008/104549 A1 | 9/2008 |
| WO | 2008/107112 A2 | 9/2008 |
| WO | WO2008/107112 A2 | 9/2008 |
| WO | WO2008/107112 A3 | 9/2008 |

(56) References Cited

FOREIGN PATENT DOCUMENTS

| WO | 2008/104549 A3 | 10/2008 |
|---|---|---|
| WO | 2008/107112 A3 | 1/2009 |
| WO | 2009/089847 A1 | 7/2009 |
| WO | 2010/025908 A1 | 3/2010 |
| WO | 2010/136593 A2 | 12/2010 |
| WO | WO 2011/000841 | 1/2011 |
| WO | 2010/136593 A3 | 2/2011 |

OTHER PUBLICATIONS

Viola, Paul, et al., "Robust Real-Time Face Detection", International Journal of Computer Vision, 18 pages; vol. 57: Issue 2, May 2004.
PCT Notification of Transmittal of the International Search Report and the Written Opinion of the International Searching Authority, or the Declaration, for PCT Application No. PCT/EP2010/057492, dated Nov. 19, 2010, 21 pages.
Jian Sun, Yin Li, Sing Bing Kang, Heung-Yeung Shum, Flash Matting, ACM Transactions on Graphics, ACM, US, LNKD-DOI: 10.1145/1141911.1141954, vol. 25, No. 3, Jul. 31, 2006, pp. 772-778, XP002398969.
PCT Notification of Transmittal of Copies of International Preliminary Report on Patentability Chapter I (IB/326), including the International Preliminary Report on Patentability (Chapter I of the Patent Cooperation Treaty), for PCT Application No. PCT/EP2010/057492, report dated Nov. 29, 2011, 14 pages.
PCT Notification of Transmittal of the International Search Report and the Written Opinion of the International Searching Authority, or the Declaration, PCT application serial No. PCT/EP2006/007573, filed Jul. 31, 2006, entitled "Digital Image Acquisition System With Portrait Mode," report dated Nov. 27, 2006, 13 pages.
Michael Braun & Georg Petschnigg: "Information fusion of Flash and Non-Flash Images." Internet Citation, (online), Dec. 31, 2002, XP002398967, Retrieved from the Internet: URL:http://graphics.stanford.edu/{georgp/vision.htm> [retrieved on Sep. 14, 2006] Section Overview, Section Object Cutout.
Scott Kelby, "Photoshop Elements 3: Down & Dirty Tricks—Chapter 1. One Hour Photo: Portrait and Studio Effects", http://proquest.safaribooksonline.com/o321278356/ch01, Dec. 27, 2004, PEACHIT Press, XP002406719, ISBN: 0-321-27835-6, 6 pages.
Morgan McGuire and Wojciech Matusick and Hanspeter Pfsiter and John F. Hughes and Fredo Durand: "Defocus video matting" SIGGRAPH 2005 (Online) Jul. 31, 2005, XP002406140, Retrieved from the Internet: URL: http://www.cs.brown.edu/people/morgan/DefocusVideoMatting/mcg05-DefocusVideoMatting.pdf> (retrieved on Nov. 7, 2006, 10 pages.
Scott Kelby, "The Photoshop Elements 4 Book for Digital Photographers—Section: Tagging Images of People (Face Tagging)", New Riders, XP002406720, ISBN: 0-321-38483-0, http://proquest.safaribooksonline.com/0321384830/ch01lev1sec12?displayrbooks=0, Nov. 14, 2005, 4 pages.
Non-Final Rejection, dated Nov. 28, 2011, for U.S. Appl. No. 121354,707, filed Jan. 15, 2009.
Final Rejection, dated May 22, 2012, for U.S. Appl. No. 12/354,707, filed Jan. 15, 2009.
Irene Kotsia, IOANNIS PITAS: Facial Expression Recognition in Image Sequences Using Geometric Deformation Features and Support Vector Machines, IEEE Transactions on Image Processing, vol. 16, No. 1, Jan. 1, 2007. pp. 172-187.
Yunus Saatci, Christopher Town, "Cascaded Classification of Gender and Facial Expression using Active Appearance Models," Automatic Face and Gesture Recognition, IEEE International Conference on, pp. 393-400, Seventh IEEE International Conference on Automatic Face and Gesture Recognition (FG'06), 2006.
Non-Final Rejection, dated Oct. 11, 2011, for U.S. Appl. No. 12/437,464, filed May 7, 2009.
Buenaposada J M, Munoz E, Baumela L, Efficiently estimating facial expression and illumination in appearance-based tracking, Proceedings of the British Machine Vision Conference, Sep. 1, 2006, pp. 1-10, XP002494036.

Li and A K Jain (Eds) S, Handbook of face recognition, Modeling Facial Shape and Appearance, Handbook of Face Recognition, Jan. 1, 2005 Springer, New York, US, pp. 39-63, XP002494037.
Romdhani S, et al., Identification by Fitting a 3D Morphable Model using linear Shape and Texture Error Functions, European Conference on Computer Vision, Jan. 2, 2002; Berlin, DE, pp. 1-15, XP003018283.
Patent Abstracts of Japan, publication No. 2005-164475 A, publication date: Jun. 23, 2005, for Measuring Apparatus for Perpendicularity.
Non-Final Rejection, dated Mar. 15, 2012, for U.S. Appl. No. 12/038,147, filed Feb. 27, 2008.
A. Zandifar, S.-N. Lim, R. Duraiswami, N. A. Gumerov, and L. S. Davis, "Multi-level fast multipole method for thin plate spline evaluation." In ICIP, 2004, pp. 1683-1686.
Korean Patent Abstracts, publication No. 1020050041772 A, May 4, 2005, Method and Device for Detecting Face in Real-Time Through Face Detecting Mode or Face Tracking Mode, and Security Monitoring System Applying the Same.
Belle V., "Detection and Recognition of Human Faces using Random Forests for a Mobile Robot" [Online] Apr. 2008, pp. 1-104, RWTH Aachen, DE MASTER OF SCIENCE THESIS, [retrieved on Apr. 29, 2010], Retrieved from the Internet: URL:http://thomas.deselaers.de/teaching/fi les/belle_master.pdf> Section 5.7 Chapters 3-5, XP002579603.
Sinjini Mitra, Marios Savvides: "Gaussian Mixture Models Based on the Frequency Spectra for Human Identification and Illumination Classification", Automatic Identification Advanced Technologies, 2005. Fourth IEEE Work Shop on Buffalo, NY, USA Oct. 17-18, 2005, Piscataway, NJ, USA, IEEE, Oct. 17, 2005, pp. 245-250, XP010856528 ISBN: 978-0/7695-2475-7.
A. Z. Kouzani: "Illumination-effects compensation in facial images", Systems, Man, and Cybernetics, 1999. IEEE SMC '99 Conference Proceedings. 1999 IEEE International Conference on Tokyo, Japan Oct. 12-15, 1999, Piscataway, NJ, USA, IEEE, US, vol. 6, Oct. 12, 1999, pp. 840-844, XP010363112 ISBN: 978-0/7803-5731-0 DOI: http://dx.doi.org/10.1109/ICSMC.1999.816661.
Maricor Soriano, Elzbieta Marszalec, J. Birgitta Martinkauppi, Matti Pietikäinen: "Making saturated facial images useful again," Proceedings of the SPIE, SPIE, Bellingham, VA, vol. 3826, Jun. 17, 1999, pp. 113-121, XP002325961 ISSN: 0277-786X DOI: http://dx.doi.org/10.1117/12.364317.
Terence Sim, Simon Baker, and Maan Bsat: "The CMU Pose, Illumination, and Expression (PIE) database," Automatic Face and Gesture Recognition, 2002. Proceedings. Fifth IEEE International Conference on, IEEE, Piscataway, NJ, USA, May 20, 2002, pp. 53-58, XP010949335 ISBN: 978-0/7695-1602-8.
Gaubatz M, Ulichney R., Automatic red-eye detection and correction, Proceedings/2002 International Conference on Image Processing: Sep. 22-25, 2002, Rochester, New York, USA, IEEE Operations Center, Piscataway, NJ, vol. 1, Sep. 22, 2002, pp. 804-807, XP010607446 ISBN: 978-0/7803-7622-9.
Chantler et al., Classifying surface texture while simultaneously estimating illumination direction International Journal of Computer Vision, 62(1-2), 83-96. Special Issue on Texture Analysis and Synthesis, 2005.
Patent Abstracts of Japan, publication No. 2001-283224, Face Collating Method, Recording Medium Stored With the Collating Method and Face Collator, published Oct. 12, 2001, 1 page.
Patent Abstracts of Japan, publication No. 2001-216518, Method and Device for Matching and Recording Medium, published Aug. 10, 2001, 1 page.
Patent Abstracts of Japan, publication No. 2006-259974, Image-Processing Method and Device, published Sep. 28, 2006, 1 page.
Zhang Lei, Lin Fuzong, Zhang Bo: A CBIR method based on color-spatial feature, IEEE Region 10th Ann. Int. Conf. 1999 (Tencon'99, Cheju, Korea, 1999). 4 pages.
Georghiades, A.S.; Belhumeur, P.N. &Kriegman, D.J., (2001). From few to many: illumination cone models for face recognition under variable lighting and pose, IEEE Trans. Pattern Anal. Mach. Intelligence, vol. 23, No. 6, pp. 643-660.
Nefian, A.V. & Hayes III, M.H. Hidden Markov Models for Face Recognition, Proc. of the IEEE International Conference on Acous-

(56) References Cited

OTHER PUBLICATIONS tics, Speech, and Signal Processing, ICASSP'98, vol. 5, May 12-15, 1998, Seattle, Washington, USA, pp. 2721-2724.
Ojala, T.; Pietikäinen, M. & Mäenpää, T. A generalized Local Binary Pattern operator for multiresolution gray scale and rotation invariant texture classification, Advances in Pattern Recognition, ICAPR 2001 Proceedings, Springer, 397-406, 2001.
Longbin Chen, Baogang Hu, Lei Zhang, Mingjing Li, Hongjiang Zhang, Face Annotation for Family Photo Album Management, International Journal of Image and Graphics, 2003, pp. 1-14, vol. 3, No. 1. World Scientific Publishing Company.
P. Jonathon Phillips, Patrick J. Flynn, Todd Scruggs, Kevin W. Bowyer, Jin Chang, Kevin Hoffman, Joe Marques, Jaesik Min, William Worek, Overview of the Face Recognition Grand Challenge, Proceedings of the 2005 IEEE Computer Society Conference on Computer Vision and Pattern Recognition (CVPR'05), 8 pages.
Corcoran, P. & Costache, G. (2005). Automated sorting of consumer image collections using face and peripheral region image classifiers, Consumer Electronics, IEEE Transactions on vol. 51, Issue 3, Aug. 2005, pp. 747-754.
Matthew Turk and Alex Pentland: Eigenfaces for Recognition, Journal of Cognitive Neuroscience, 3(1), 1991, pp. 71-86.
H. Lai, P. C. Yuen, and G. C. Feng, Face recognition using holistic Fourier invariant features, Pattern Recognition, 2001, vol. 34, pp. 95-109.
Ronny Tjahyadi, Wanquan Liu, Svetha Venkatesh: Application of the DCT Energy Histogram for Face Recognition, Proceedings of the 2nd International Conference on Information Technology for Application, (ICITA 2004), pp. 305-310.
Tianhorng Chang and C.-C. Jay Kuo: Texture analysis and classification with tree-structured wavelet transform, IEEE Transactions on Image Processing, vol. 2, No. 4, 1993, pp. 429-441.
Markus Stricker and Markus Orengo: Similarity of color images, SPIE Proc., 1995, 12 pages.
Lienhart, R., Liang, L, and Kuranov, A., A Detector Tree of Boosted Classifiers for Real-Time Object Detection and Tracking, Proceedings of the 2003 International Conference on Multimedia and Expo—vol. 1, pp. 277-280 (2003), ISBN:0/7803-7965-9, Publisher IEEE Computer Society, Washington, DC, USA.
Jing Huang, Ravi Kumar, Mandar Mitra, Wei-Jing Zhu, Ramin Zabih. Image Indexing Using Color Correlograms. In 1997 Conference on Computer Vision and Pattern Recognition (CVPR 97), Jun. 17-19, 1997, San Juan, Puerto Rico. pp. 762-768, IEEE Computer Society, 1997, pp. 762-768.
S. J. Wan, P. Prusinkiewicz, S. K. M. Wong, Variance-based color image quantization for frame buffer display, Color Research & Application, vol. 15, Issue 1, 1990. pp. 52-58, Copyright @ 1990 Wiley Periodicals, Inc., A Wiley Company.

Patent Abstracts of Japan for Japanese Patent Application Laid-Open No. 2004-023518. For Image Pickup Device. Publication Date: Jan. 22, 2004.
Patent Abstracts of Japan for Japanese Patent Application Laid-Open No. 2003-018398. For: Method for Generating a Super-Resolution Image from Pixel Image. Publication Date: Jan. 17, 2003.
Patent Abstracts of Japan for Japanese Patent Application Laid-Open No. 2003-187233. For: Method for Automatically Detecting Red-Eye Defect in Photographic Image Data. Publication Date: Jul. 4, 2003.
Patent Abstracts of Japan for Japanese Patent Application Laid-Open No. 2003-274271. For: Image Photographing Method, Image Outputting Method and Camera. Publication Date: Sep. 26, 2003.
Patent Abstracts of Japan for Japanese Patent Application Laid-Open No. 2003-179807. For: Image Pickup Device. Publication Date: Jun. 27, 2003.
Patent Abstracts of Japan for Japanese Patent Application Laid-Open No. Hei 10-233929. For: Image Processor and Image Processing Method. Publication Date: Sep. 2, 1998.
Patent Abstracts of Japan for Japanese Patent Application Laid-Open No. 2000-305141. For Electronic Camera. Publication Date: Nov. 2, 2000.
Patent Application which claims priority to U.S. Appl. No. 60/773,714, filed Feb. 14, 2006 (24 pages).
Japanese Office Action received in International Application No. 2012-516781 dated Jun. 18, 2013 (4 pages).
Japanese Current Claims of 2012-516781 dated Jun. 2013 (4 pages).
International Searching Authority, "Search Report and Written Opinion", in application No. PCT/EP2010/057492, dated Nov. 19, 2010, 21 pages.
Current Claims in application No. PCT/EP2010/057492, dated Nov. 2010, 11 pages.
International Searching Authority, "Search Report and Written Opinion", in application No. PCT/EP2010/059228, dated Nov. 19, 2010, 19 pages.
Current Claims in application No. PCT/ EP2010/059228, dated Nov. 2010, 8 pages.
Harguess et al., "A Case for the Average-Half-face in 2D and 3D for a Face Recognition", IEEE, dated 2009, 6 pages.
Japanese Office Action received in International Application No. 512405/2012 dated Jun. 25, 2013 (7 pages).
Japanese Current Claims of 512405/2012 dated Jun. 2013 (9 pages).
Sun, J. et al., "Flash Matting" 2006 ACM (pp. 772-778).
Tang et al., "Representing Images Using Nonorthogonal Haar-Like Bases", IEEE, vol. 29, No. 12, dated Dec. 2007, 15 pages.
Wikipedia, "Haar-like features", http://en.wikipedia.org/wiki/Haar-like_features, last accessed on Aug. 11, 2013, 1 page.
Whitehill et al., "Haar Features for FACS AU Recognition" IEEE, dated 2006, 5 pages.

\* cited by examiner

METHODS AND APPARATUSES FOR FOREGROUND, TOP-OF-THE-HEAD SEPARATION FROM BACKGROUND

CLAIM OF PRIORITY

The present application claims domestic priority under 35 U.S.C. §119(e) to U.S. Provisional Patent Application Ser. No. 61/182,625, which is titled "Methods And Apparatuses For Foreground, Top-Of-The-Head Separation From Background," which was filed on May 29, 2009, and whose contents are incorporated by reference herein.

FIELD OF THE INVENTION

The present invention relates generally to digital image processing and more particularly to techniques for separating an object in the foreground of a captured digital image from a surrounding background in the captured digital image.

BACKGROUND

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

Segmentation of a digital image involves identifying regions in the image based on some predefined criteria. These criteria may be contextual, numerical, shape, size, and/or color-related, gradient-related and more. A background/foreground segmented image can be used in numerous digital image processing algorithms such as algorithms to enhance the separation of a subject in the foreground from the background in order to enhance depth of field, to enhance or eliminate the background altogether, or to extract objects such as faces or people from an image. A background/foreground segmented image can also be used for numerous image processing operations that include image enhancement, color correction, and/or object-based image analysis.

A digital image acquisition system with no film can include an apparatus for capturing digital images, a flash unit for providing illumination during image capture, and a segmentation tool. The segmentation tool can distinguish an object, such as a person, in the foreground of a captured digital image from a background of the captured digital image. One technique for performing the segmentation comprises comparing an image taken with a flash to an image taken without a flash. For example, the non-flash image might be taken immediately before the flash image, and the non-flash image might be taken at a lower resolution in order to improve device performance. The foreground of the image can be determined by identifying a change in intensity between portions of the flash image and corresponding portions of the non-flash image. Due to proximity to the flash, an object in the foreground of an image will experience a higher change in intensity when captured with a flash than will objects in the background.

The technique of measuring a change in intensity between portions of a flash image and portions of a non-flash image, however, has some limitations. For example, in a digital image, it is common for a person's head to not be properly illuminated by a flash because of the angle the light reflects off of the top of the head. Instead, it is common for a person's head to be strongly illuminated by ambient illumination, such as the sun, resulting in a difference in intensity in that particular area (top of the head) that is lower than other areas of the person, and thus indicative of being part of the image's background even though it is part of a foreground object.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Embodiments of the present invention include a method of distinguishing between foreground and background regions of a digital image of a scene. One or more foreground objects can be identified in a binary image map that distinguishes between foreground pixels and background pixels. From the one or more foreground objects, a primary foreground object can be identified, and based in part on the identified primary foreground object, a head region of the primary foreground object can be estimated. Within the head region, patterns of foreground pixels and background pixels that are indicative of a head crown region can be identified. Within the head crown region, pixels identified as background pixels that actually show portions of the primary foreground object can be converted to foreground pixels, thus improving the accuracy of the binary image map.

Digital Image Acquisition System

Figure 1:
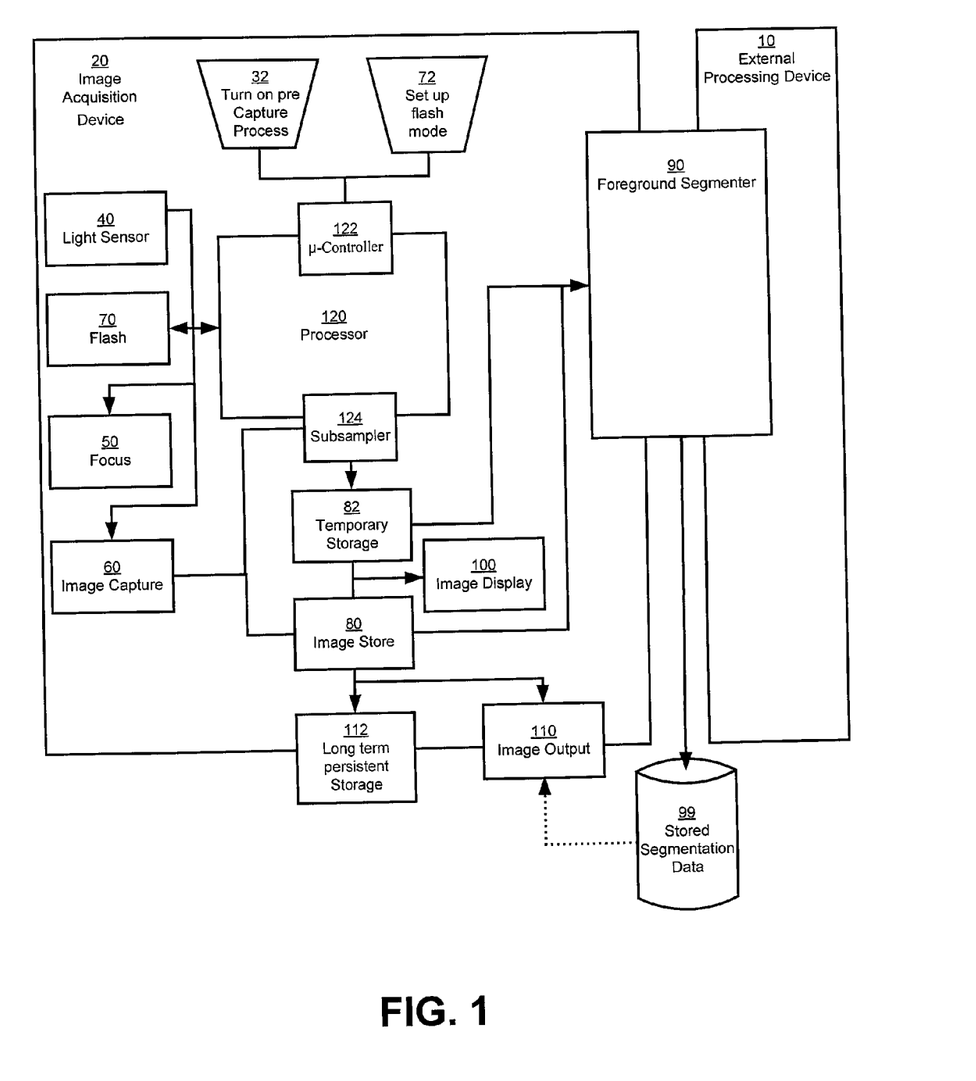
FIG. 1 shows a block diagram of a digital image acquisition device upon which an embodiment of the present invention may be implemented.

FIG. 1 shows a block diagram of a digital image acquisition device 20 operating in accordance with a preferred embodiment. The digital image acquisition device 20, which in the present embodiment might be a portable digital camera, includes a processor 120. It can be appreciated that many of the processes implemented in the digital camera can be implemented in or controlled by software operating in a microprocessor, central processing unit, controller, digital signal processor and/or an application specific integrated circuit (ASIC), collectively depicted as block 120 labeled "processor." Generically, user interface and control of peripheral components such as buttons and display is controlled by a micro-controller 122.

The processor 120, in response to a user input at 122, such as half pressing a shutter button (pre-capture mode 32), initiates and controls the digital photographic process. Ambient light exposure is determined using light sensor 40 in order to automatically determine if a flash is to be used. The distance to the subject is determined using focusing means 50 which also focuses the image on image capture component 60. If a flash is to be used, processor 120 causes the flash 70 to generate a photographic flash in substantial coincidence with the recording of the image by image capture component 60 upon full depression of the shutter button.

The image capture component 60 digitally records the image in color. The image capture component 60 is known to those familiar with the art and may include a CCD (charge coupled device) or CMOS to facilitate digital recording. The flash may be selectively generated either in response to the light sensor 40 or a manual input 72 from the user of the camera. The image I(x,y) recorded by image capture component 60 is stored in image store component 80 which may comprise computer memory such as dynamic random access memory or a non-volatile memory. The camera is equipped with a display 100, such as an LCD, for preview and postview of images.

In the case of preview images P(x,y), which are generated in the pre-capture mode 32 with the shutter button half-pressed, the display 100 can assist the user in composing the image, as well as being used to determine focusing and exposure. A temporary storage space 82 is used to store one or a plurality of the preview images and can be part of the image store means 80 or a separate component. The preview image is usually generated by the image capture component 60. Parameters of the preview image may be recorded for later use when equating the ambient conditions with the final image. Alternatively, the parameters may be determined to match those of the consequently captured, full resolution image. For speed and memory efficiency reasons, preview images may be generated by subsampling a raw captured image using software 124 which can be part of a general processor 120 or dedicated hardware or combination thereof, before displaying or storing the preview image. The sub sampling may be for horizontal, vertical or a combination of the two. Depending on the settings of this hardware subsystem, the pre-acquisition image processing may satisfy some pre-determined test criteria prior to storing a preview image. Such test criteria may be chronological—such as to constantly replace the previous saved preview image with a new captured preview image every 0.5 seconds during the pre-capture mode 32, until the final full resolution image I(x,y) is captured by full depression of the shutter button. More sophisticated criteria may involve analysis of the preview image content, for example, testing the image for changes, or the detection of faces in the image before deciding whether the new preview image should replace a previously saved image. Other criteria may be based on image analysis such as the sharpness, detection of eyes or metadata analysis such as the exposure condition, whether a flash is going to happen, and/or the distance to the subjects.

If test criteria are not met, the camera continues by capturing the next preview image without saving the current one. The process continues until the final full resolution image I(x,y) is acquired and saved by fully depressing the shutter button.

Where multiple preview images can be saved, a new preview image will be placed on a chronological First In First Out (FIFO) stack, until the user takes the final picture. The reason for storing multiple preview images is that the last image, or any single image, may not be the best reference image for comparison with the final full resolution image. By storing multiple images, a better reference image can be achieved, and a closer alignment between the preview and the final captured image can be achieved in an alignment stage. Other reasons for capturing multiple images are that a single image may be blurred due to motion, the focus might not be set, and/or the exposure might not be set.

In an alternative embodiment, the multiple images may be a combination of preview images, which are images captured prior to the main full resolution image, and postview images, which are images captured after said main image. In one embodiment, multiple preview images may assist in creating a single higher quality reference image, either by using a higher resolution or by taking different portions of different regions from the multiple images.

A segmentation filter 90 analyzes the stored image I(x,y) for foreground and background characteristics before forwarding the image along with its foreground/background segmentation information 99 for further processing or display. The filter 90 can be integral to the camera 20 or part of an external processing device 10 such as a desktop computer, a hand held device, a cell phone handset or a server. In this embodiment, the segmentation filter 90 receives the captured image I(x,y) from the full resolution image storage 80. Segmentation filter 90 also receives one or a plurality of preview images P(x,y) from the temporary storage 82.

The image I(x,y) as captured, segmented and/or further processed may be either displayed on image display 100, saved on a persistent storage 112 which can be internal or a removable storage such as CF card, SD card, USB dongle, or the like, or downloaded to another device, such as a personal computer, server or printer via image output component 110 which can be tethered or wireless. The segmentation data may also be stored 99 either in the image header, as a separate file, or forwarded to another function which uses this information for image manipulation.

In embodiments where the segmentation filter 90 is implemented in an external application in a separate device 10, such as a desktop computer, the final captured image I(x,y) stored in block 80 along with a representation of the preview image as temporarily stored in 82, may be stored prior to modification on the storage device 112, or transferred together via the image output component 110 onto the external device 10, later to be processed by the segmentation filter 90. The preview image or multiple images, also referred to as sprite-images, may be pre-processed prior to storage, to improve compression rate, remove redundant data between images, align or color compress data.

Example Method

Figure 2:
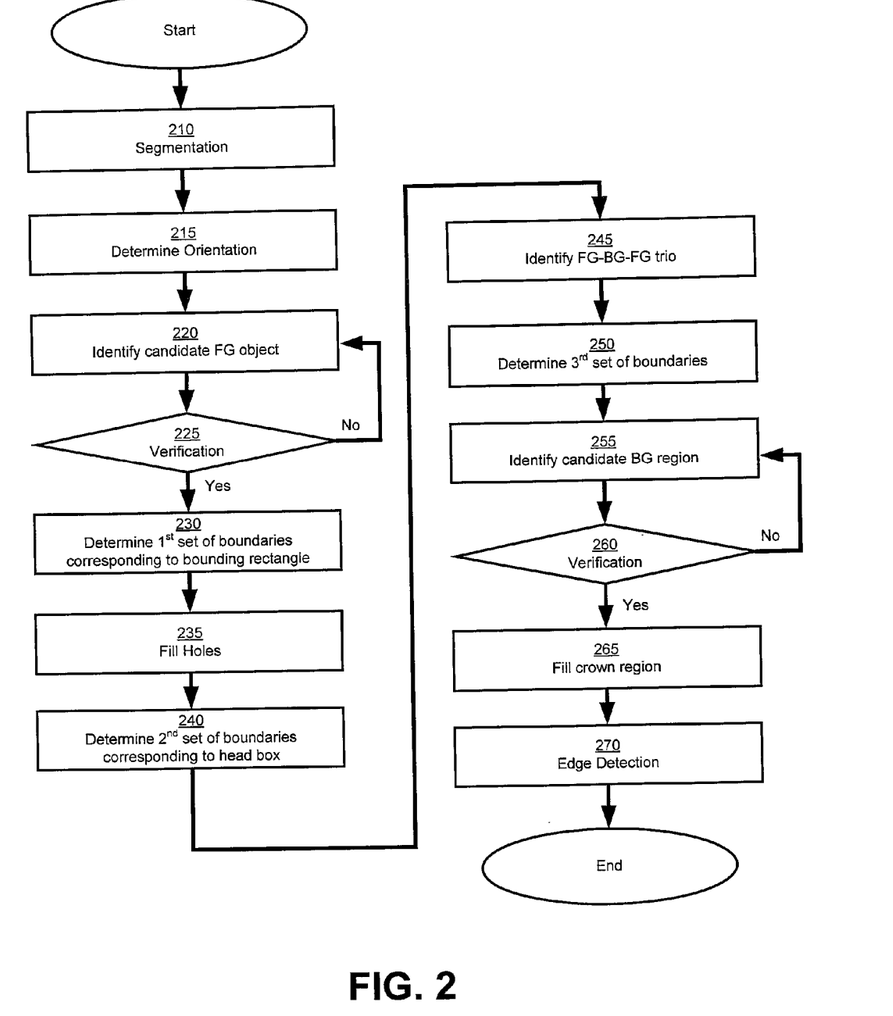
FIG. 2 shows a flow chart of a method embodying techniques of the present invention.

FIG. 2 is a flow chart showing a method according to an embodiment of the present invention. The segmentation filter 90 of the image acquisition device 20 (also referred to as a "camera" in parts of the disclosure) shown in FIG. 1 can use the foreground/background segmentation information 99 of a stored image I(x,y) to produce a binary map with foreground (FG) pixels and background (BG) pixels (Block 210). The binary map might, for example, assign a first value to background pixels and a second value to foreground pixels such that an image corresponding to the binary map shows the foreground image in black and the background in white. U.S. Patent Publication No. 2006/0039690, titled "Foreground/Background Segmentation In Digital Images With Differential Exposure Calculations," filed Aug. 30, 2005, is hereby incorporated by reference in its entirety. In one embodiment of the present invention, the binary map is refined to improve the quality of the segmentation of a foreground object from the background of a digital image.

Depending on available features of the camera, a variable indicating the orientation of the stored image I(x,y) can be stored (Block 215). The orientation of the stored image I(x,y)

can identify whether the image is a portrait image or a landscape image. Thus, the orientation indicates which side of the image constitutes the top of the image, which side constitutes the right side of the image, and so on. As it can be assumed that the image was not captured while the camera was upside down, the orientation can be determined from three possible orientations (i.e., the camera was not rotated when the image was taken, the camera was rotated ninety degrees to the right, or the camera was rotated ninety degrees to the left). The variable can either indicate a certain orientation (OrCert) or an uncertain orientation (OrUncert) depending on how the orientation was determined. For example, if the user specifies the image orientation or if the image acquisition device contains motion sensing technology that can detect the rotation of the image acquisition device at the time of image capture, then an OrCert might be stored, indicating that the orientation is believed with a high degree of confidence to be accurate. Alternatively, if the orientation is determined from an analysis of an acquired image, such as by assuming that the side of the image with the highest average intensity is the top of the image, then an OrUncert might be stored, indicating that the orientation is based on estimates that cannot guarantee accuracy to the same degree. If a value for OrUncert is stored, additional information or additional algorithms such as face detection algorithms might be used in order to confirm the orientation.

After the orientation of the image has been determined, groups of foreground pixels on the binary image map can be labeled, and the group constituting the primary foreground object can be identified (block 220). Each continuous region of foreground pixels can be given a unique label. The labeled regions can then be filtered to determine which continuous region constitutes the primary foreground object. The continuous region of foreground pixels with the largest pixel area can be identified as the primary foreground object, and continuous regions of foreground pixels that do not have the largest pixel area can be identified as not being the primary foreground object. These lesser regions are converted to background pixels.

In some embodiments, the continuous region of foreground pixels with the largest pixel area might not be automatically identified as the primary foreground object, but instead might be subjected to further analysis. For example, if the continuous region of foreground pixels with the largest pixel area does not touch the bottom of the image, as determined by the stored orientation, then the region might be discarded in favor of the second largest continuous region of foreground pixels (block 225, "no" path). If the second largest region does touch the bottom of the image, then the second largest region can be confirmed as being the primary foreground object (block 225, "yes" path). Additional regions can continue to be analyzed until one that touches the bottom of the image is identified. If no region touches the bottom of the image, then the technique stops.

Figure 3A:
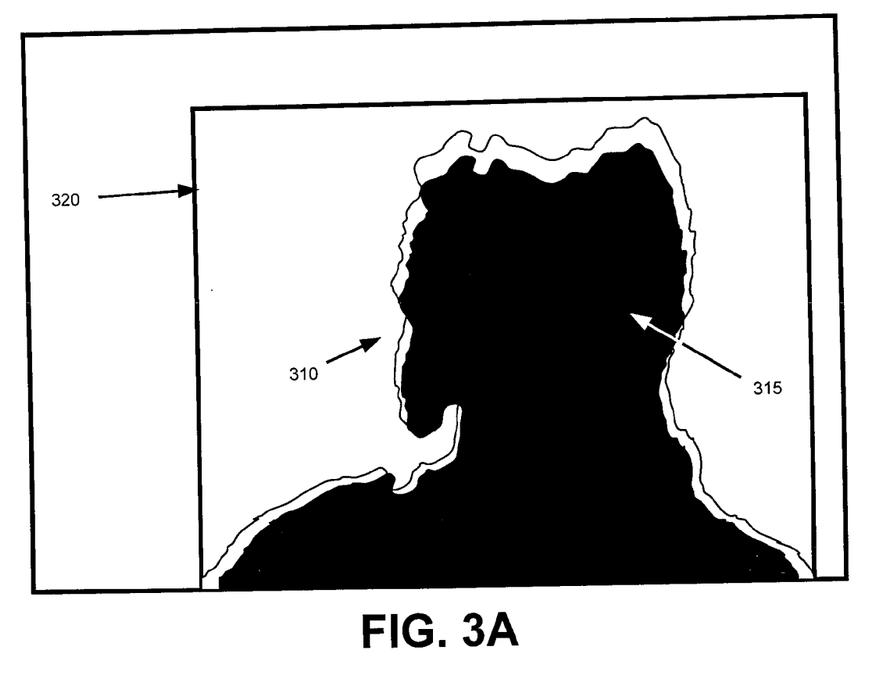
FIGS. 3a-c show examples of binary image maps at various stages of the method described in FIG. 2.

After the labeling and filtering (blocks 220 and 225), the binary image map will contain only the primary foreground object. From the binary image map containing the primary foreground object, a first set of boundaries, corresponding to a bounding rectangle, can be determined (block 230). The left boundary of the first set of boundaries can correspond to the left-most foreground pixel of the foreground object. The right boundary of the first set of boundaries can correspond to the right-most foreground pixel of the primary foreground object. The top boundary of the first set of boundaries can correspond to the top-most foreground pixel of the primary foreground object, and the bottom boundary can correspond to the bottom-most pixel of the primary foreground, which will typically be the bottom border of the image. FIG. 3a shows an example of a binary image map containing a single foreground object (310) and a bounding rectangle (320) corresponding to the first set of boundaries.

Figure 3B:
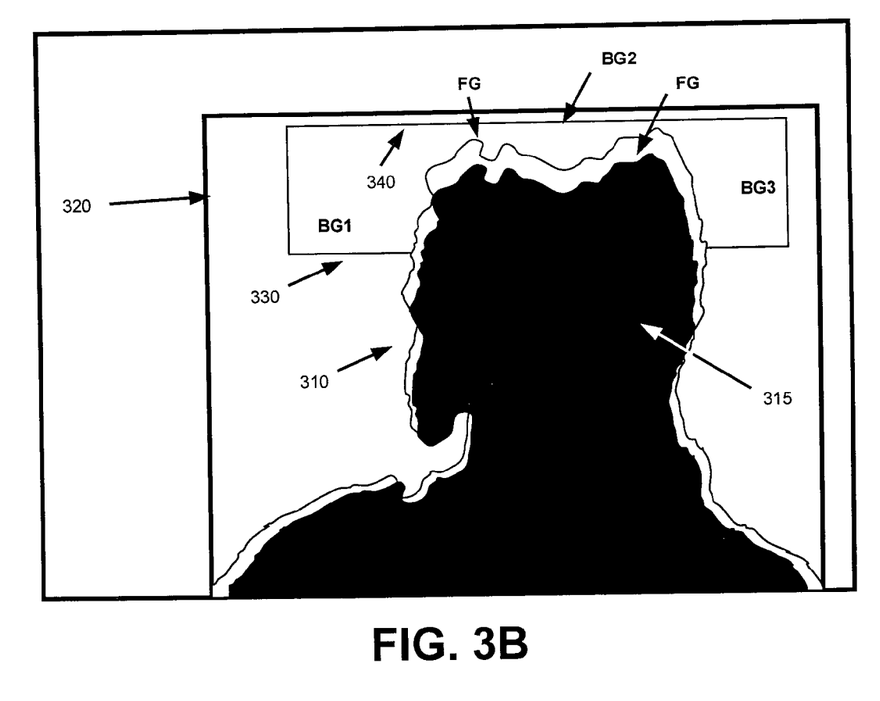

After the primary foreground object is identified (blocks 220 and 225) and a first set of boundaries is determined (block 230), holes in the primary foreground object can be filled (block 235). For example, a dark unreflective surface, such as from clothing or another object, might cause a pixel to be identified as a background pixel even though it represents the primary foreground object, and therefore should be identified on the binary image map as a foreground pixel. FIG. 3a shows an example of a hole 315 in the primary foreground object. In FIG. 3b, the hole has been filled.

Holes can be identified by identifying regions of background pixels that meet one or more criteria. For example, any continuous region of background pixels that is entirely surrounded by foreground pixels and does not touch any of the first set of boundaries identified by the bounding rectangle 320 of FIG. 3a can be identified as a hole. Groups of background pixels identified as holes can be changed to foreground pixels. In order to avoid incorrectly converting regions of background pixels that should not be converted, one embodiment of the present invention includes only converting holes to foreground pixels if the hole constitutes less than a threshold amount of area, such as less than a certain percentage of the total image area, less than a certain percentage of the total area of foreground pixels, or less than a certain percentage of the total area of background pixels. The certain percentages are generally low, such as 1.5%, and can be chosen in order to prevent converting large background regions that might result from situations such as a person creating a hole by touching his head during image capture.

After the holes are filled, a second set of boundaries, corresponding to a head region box likely to define the head region of the foreground object, can be defined (block 240). The second set of boundaries can be defined based on the orientation of the digital image as well as the first set of boundaries corresponding to the bounding rectangle. For example, the width of the head box might be defined to be three-fourths of the width of the bounding rectangle and aligned to the middle of the bounding rectangle, such that one-eighth of the bounding rectangle is to the left of the head box, and one-eighth of the bounding rectangle is to the right of the head region box. The head box might also be defined as being one-fourth the height of the bounding rectangle and aligned to the top of the bounding rectangle. Alternatively, the boundaries of the head box might be defined based on an estimated location for a face determined by one or more face detection algorithms. FIG. 3b shows an example of a binary image map with a head box 330.

A recursive crown detection and filling module (RCDF module) can identify crowns within the head box 330 by parsing each row within the head box 330 to determine if it contains a FG-BG-FG trio (block 245). A FG-BG-FG trio is a horizontal line or plurality of horizontal lines that has a first group of foreground pixels to the left of a group of background pixels and a second group of foreground pixels to the right of the group of background pixels. The RCDF module can analyze the top row of the head region box 330 to determine if it contains a FG-BG-FG trio, and if it does not, then the RCDF can analyze the second row from the top to determine if it contains a FG-BG-FG trio. This process can be repeated until the first row from the top that contains a FG-BG-FG trio is identified. The first row from the top that contains a FG-BG-FG trio can be referred to as a trio line 340.

FIG. 3b shows an example of a binary map with a trio line 340. If no trio line is found within the head region box 330, then the algorithm can stop.

To avoid falsely identifying portions of the image as head crowns that are not head crowns, additional parameters can be used in identifying a trio line 340. For example, the RCDF module might be configured to only find FG-BG-FG trios where the left and/or right groups of FG pixels are at least five pixels wide. Such a search criteria might prevent the RCDF module from identifying small details in the image, caused by stray hairs for example, as representing crowns. Additionally, the RCDF might be configured to only identify FG-BG-FG trios where the group of BG pixels is smaller than a certain width, such as 50 pixels. Such criteria can prevent the RCDF from identifying objects extraneous to the head, such as a raised hand, as representing the beginning of a head crown.

The trio line 340 can be used to identify a third set of boundaries corresponding to a new box of interest (also called the crown box), and within the crown box, background regions can be identified (block 250). The left, right, and bottom of the crown box can correspond to the same boundaries as the left, right, and bottom of the head region box 330, but the top of the crown box can be defined by the trio line 340. Within the crown box, each unique background region can be assigned a unique label. In FIG. 3b, these labels are shown as BG1, BG2, and BG3. Based on an analysis, it can be determined which identified BG regions represent the crown region and which represent actual background (block 255). For example, BG regions that touch the sides or the bottom of the crown box, such as BG1 and BG3, might be identified as actual background regions, while a region or regions that do not touch the sides or bottom of the crown box, such as BG2, might be identified as the crown region.

In some embodiments, regions identified as possibly being part of the crown region, such as BG2 in FIG. 3b, can undergo additional tests to verify whether or not the region in fact represents an actual crown region (block 260). For example, the average luminescence of the crown region can be compared to the average luminescence of a group of foreground pixels in the surrounding foreground image. The comparison can be made on a grey scale image obtained using a flash. The determination of whether a pixel is a foreground pixel or a background pixel is binary and based on whether the change in luminescence between a flash image and non-flash image is greater than a certain value. Therefore, it can be assumed that the difference in luminescence between a background pixel in the crown region and an adjacent foreground pixel will be relatively small when compared to a foreground pixel and an actual background pixel.

If the identified crown region passes the additional tests (block 260, yes path), then the pixels comprising the crown region can be converted from background pixels to foreground pixels (block 265). If the identified crown region does not pass the additional tests (block 260, no path), then the identified crown region can be marked as already tested, and the pixels will not be converted from background to foreground pixels. In response to the identified crown region not passing the additional test (block 260, no path), another trio line can be identified and the process can repeat (block s 245, 250, 255, and 260).

Figure 3C:
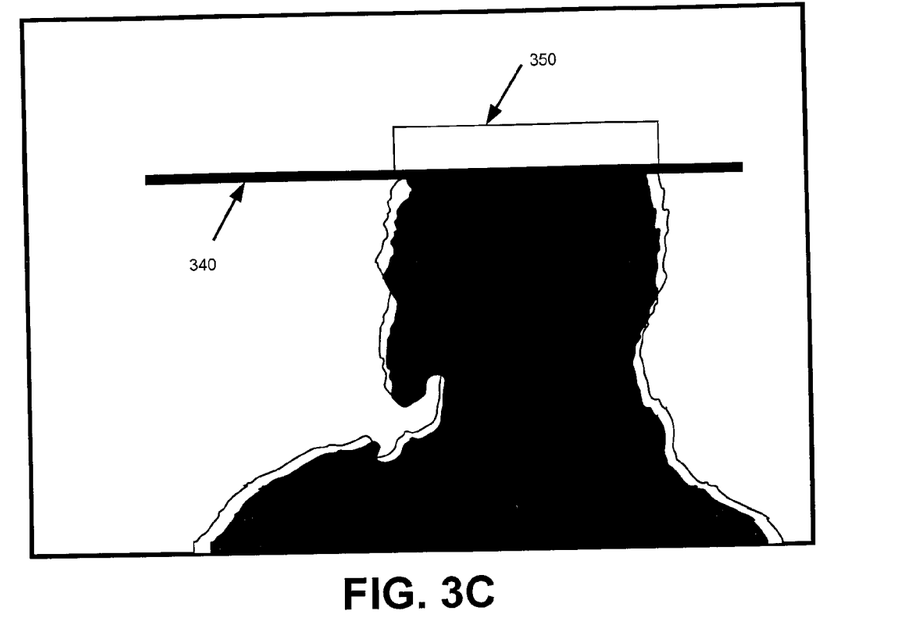

After filling an identified crown region that passes the additional tests (blocks 260 and 265), edge detection can be used to identify a top of the crown that might be above a filled in identified crown region (i.e., above a trio line) (block 270). A region above the top of the crown can be identified as a region of interest 350. FIG. 3c shows, the image of FIG. 3b with the crown region filled. FIG. 3c also shows a box corresponding to the region of interest 350. The region of interest 350 can be bounded on the top by a line that is a predetermined, maximum height above the trio line 340 and can be bounded on the left and right by the width of the FG-BG-FG trio, such that the region of interest 350 is bound on the left by the left-most FG pixel in the FG-BG-FG trio and bound on the right by the right-most FG pixel in the FG-BG-FG trio.

Within the region of interest 350, a starting point can be defined. The starting point might, for example, lie one pixel above the trio line 340 and equidistant from both the left and right sides of the region of interest 350. Starting at the defined starting point, a region growing algorithm can be executed, and the growing can be stopped when the borders of region of interest are reached or when edges are determined. Any edge detecting algorithm known in the art, such as the Prewitt edge detection algorithm, can be used to determine edges of the head.

The edges determined by the edge detecting algorithm can be verified for accuracy. For example, if the detected edges exceed the region of interest 350, then the edges can be identified as inaccurate, and if the detected edges are within the region of interest, then the edges can be identified as accurate. In response to determining that detected edges are accurate, the area bound by the detected edges may be added to the foreground map, and in response to determining that the detected edges are not accurate, the area bound by the detected edges is not added to the foreground map.

Techniques of the present invention can further include a warning module for detecting possibly incorrect filling. A detection of incorrect filling can be stored as metadata associated with a captured image and used to inform a user that crown filling has been performed. A message informing the user can be delivered to a user on the image acquisition device soon after the image is acquired or delivered to the user during post-acquisition processing that might occur, for example, on a personal computer. Alternatively, a camera might be programmed to present a user with an unaltered image instead of an imaged with crown filling if possibly incorrect filling has been detected.

Such a warning might be presented to a user every time filling is performed or only under certain circumstances. For example, the warning module might only present a warning to the user if the ratio of an object's perimeter to the object's area is greater than a certain value. A low perimeter to area ratio can be indicative of a lack of detail on that object, which might be attributable to incorrect filling.

Figures 4, 4A, 4B, 4C:
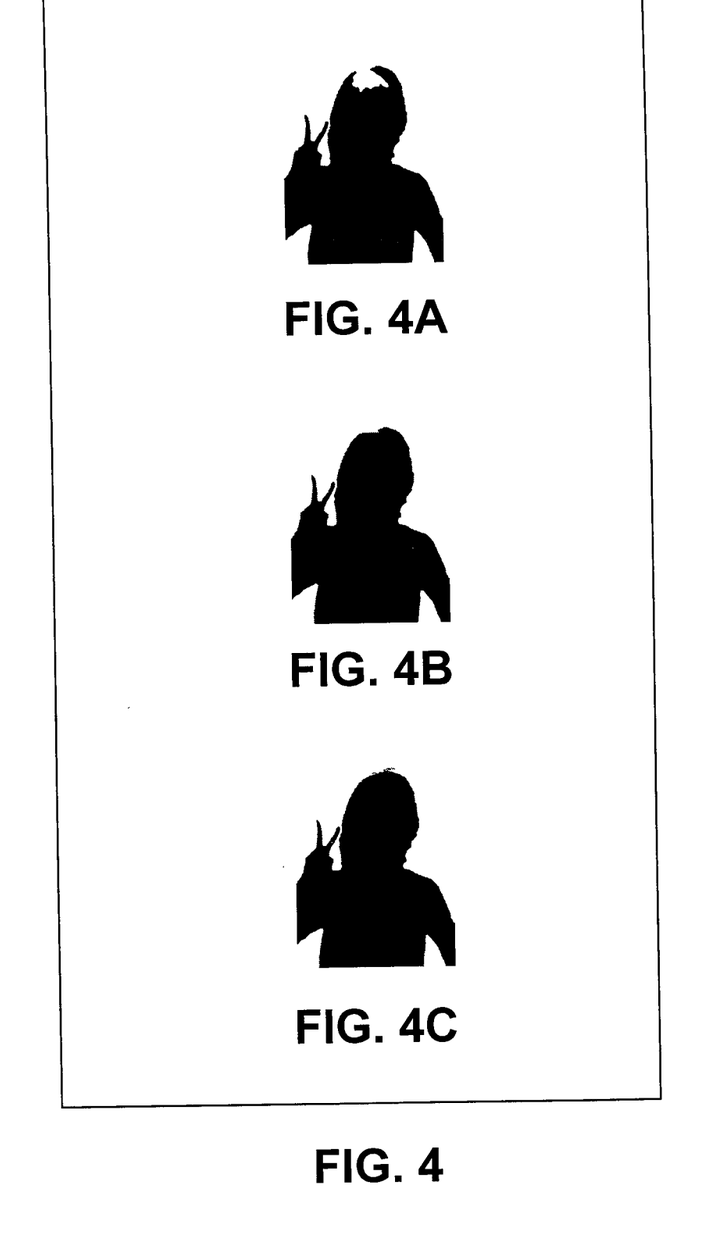
FIG. 4 shows additional examples of binary image maps at various stages of the method described in FIG. 2.

FIG. 4 shows graphical examples of a binary image map at various stages in the method of FIG. 2. FIG. 4a shows a single foreground object with a crown. FIG. 4a, might for example, be a representation of the binary image map after the hole filling described in block 235 of FIG. 2. FIG. 4b shows the same image as FIG. 4a but with the crown filled. FIG. 4b might, for example, be a representation of the binary image map after the crown filling of block 265 in FIG. 2. FIG. 4c shows the same image as FIG. 4b but with some additional background.

While aspects of the present invention have been explained using an image with a single foreground object with a single crown region, it should be apparent that the techniques of the present invention are extendable to include detecting and filling multiple crown regions within a single foreground object, or to detecting and filling one or more crown regions in more than one foreground object.

Embodiments of the present invention include a method of distinguishing between foreground and background regions of a digital image of a scene, wherein the method comprises: (a) identifying in a binary image map comprising one or more foreground objects, a primary foreground object; (b) analyzing a head region of the primary foreground object to identify a trio line, wherein the trio line comprises a first group of one or more foreground pixels to the left of a group of background pixels and a second group of one or more foreground pixels to the right of the group of background pixels; (c) identifying, based at least in part on the trio line, a crown region of the binary image map; and (d) converting background pixels in the crown region of the binary image map to foreground pixels.

Embodiments of the present invention include a method of distinguishing between foreground and background regions of a digital image of a scene, wherein the method comprises: (a) storing a segmented image identifying foreground (FG) pixels and background (BG) pixels; (b) determining an orientation of the segmented image; (c) identifying in the image one or more groups of continuous foreground pixels; (d) identifying from the one or more groups of continuous foreground pixels, a candidate primary foreground object; (e) performing further analysis on the candidate primary foreground object to determine if the candidate primary foreground object is a primary foreground object; (f) determining based at least in part on the primary foreground object, a first set of boundaries, wherein the first set of boundaries comprises a left-most pixel of the primary foreground object, a right-most pixel of the primary foreground object, a top-most pixel of the primary foreground object, and a bottom-most pixel of the primary foreground object; (g) filling holes in the primary foreground object; (h) determining, based at least in part on the first set of boundaries, a second set of boundaries corresponding to a likely region of a head in the primary foreground object; (i) identifying within the second set of boundaries, a FG-BG-FG trio; (j) determining, at least based in part on the second set of boundaries and an identified FG-BG-FG trio, a third set of boundaries; (k) identifying in the third set of boundaries one or more groups of continuous background pixels; (l) identifying from the one or more groups of continuous background pixels, a candidate crown region; (m) performing further analysis on the candidate crown region to determine if the candidate crown region is an actual crown region; (n) converting background pixels within the crown region to foreground pixels; (o) and executing an edge detection algorithm, wherein a starting point for the edge detection algorithm is determined at least based in part on the FG-BG-FG trio.

Embodiments of the present invention also include a digital image acquisition system having no photographic film comprising means for carrying out one more steps of the methods described in this application. Alternate embodiments of the present invention include one or more machine-readable storage media storing instructions which when executed by one or more computing devices cause the performance of one or more steps of the methods described in this application.

Hardware Overview

According to one embodiment, the techniques described herein are implemented by one or more special-purpose computing devices. The special-purpose computing devices can be incorporated into the digital image acquisition device described in FIG. 1 or might be separate from the digital image acquisition described in FIG. 1.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
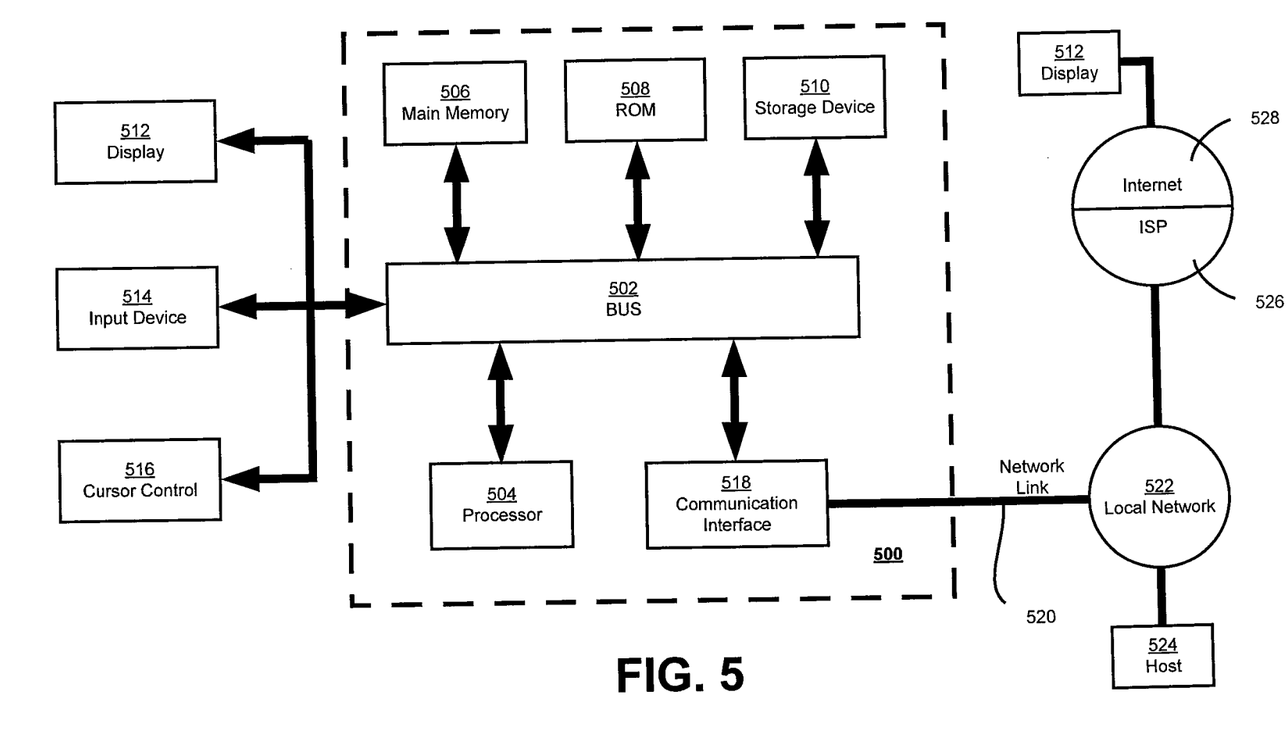
FIG. 5 shows a block diagram of a computing device upon which an embodiment of the present invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

In this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising steps of:
    reading, from a storage device, a first image of a scene that was captured with a first amount of illumination;
    reading, from the storage device, a second image of the scene that was captured with a second amount of illumination that differs from the first amount of illumination;
    distinguishing a foreground portion of the scene from a background portion of the scene based on a comparison of the first image to the second image;
    identifying, in the scene, a crown region that contains a crown of a person's head;
    identifying portions of the crown region that have been misidentified as belonging to the background portion rather than the foreground portion; and
    recharacterizing the misidentified portions of the crown region as belonging to the foreground portion rather than the background portion;
    wherein the steps are performed by an automated device.

2. The method of claim 1, wherein identifying the crown region comprises:
    identifying a primary foreground object by identifying a largest contiguous region of the foreground portion; and
    recharacterizing all parts of the foreground portion that are external to the primary foreground object as belonging to the background portion rather than the foreground portion.

3. The method of claim 1, wherein identifying the crown region comprises:
    identifying a largest contiguous region of the foreground portion; and
    determining whether the largest contiguous region contacts a bottom of a particular image that is either the first image or the second image;
    in response to determining that the largest contiguous region does not contact the bottom of the particular image, identifying, within the foreground portion, as a primary foreground object, a next-largest contiguous region that (a) is not as large as the largest contiguous region and (b) contacts the bottom of the particular image; and recharacterizing all parts of the foreground portion that are external to the primary foreground object as belonging to the background portion rather than the foreground portion.

4. The method of claim 1, wherein identifying the crown region comprises:
identifying a sub-region of the background portion that is entirely surrounded by the foreground portion;
determining whether the sub-region contacts any portion of a rectangle that bounds an area that contains at least a part of the foreground portion; and
in response to determining that the sub-region does not contact any portion of the rectangle, recharacterizing all parts of the sub-region as belonging to the foreground portion rather than the background portion.

5. The method of claim 1, wherein identifying the crown region comprises:
identifying a sub-region of the background portion that is entirely surrounded by the foreground portion;
determining whether the sub-region contacts any portion of a rectangle that bounds an area that contains at least a part of the foreground portion;
determining whether the sub-region occupies less than a specified percentage of a specified area; and
in response to determining that (a) the sub-region does not contact any portion of the rectangle and (b) the sub-region occupies less than a specified percentage of the specified area, recharacterizing all parts of the sub-region as belonging to the foreground portion rather than the background portion.

6. The method of claim 1, wherein identifying the crown region comprises:
identifying a primary foreground object within the foreground portion based at least in part on the primary foreground object being a largest contiguous region of the foreground portion;
identifying a bounding rectangle whose sides contact uppermost, lowermost, leftmost, and rightmost extents of the primary foreground object; and
identifying, within the bounding rectangle, a head box that is defined have (a) a width that is a specified fraction of a width of the bounding rectangle and (b) a height that is a specified fraction of a height of the bounding rectangle.

7. The method of claim 1, wherein identifying the crown region comprises:
identifying a primary foreground object within the foreground portion based at least in part on the primary foreground object being a largest contiguous region of the foreground portion;
identifying, based at least in part on a face-detection algorithm, a facial region of the primary foreground object; and
identifying a head box whose edges contact uppermost, lowermost, leftmost, and rightmost extents of the facial region.

8. The method of claim 1, wherein identifying the crown region comprises:
identifying a head box that bounds the person's head;
locating, within the head box, a trio line that is an uppermost pixel row that also contains pixels from the foreground portion followed by pixels from the background portion followed by pixels from the foreground portion;
identifying a crown box (a) whose leftmost, rightmost, and lowermost sides are the leftmost, rightmost, and lowermost sides of the head box, and (b) whose uppermost side is the trio line;
identifying, within the crown box, one or more sub-regions that both (a) belong to the background portion and (b) do not touch any side of the crown box; and
recharacterizing each of the one or more sub-regions as belonging to the foreground portion rather than the background portion.

9. The method of claim 1, wherein identifying the crown region comprises:
identifying a head box that bounds the person's head;
locating, within the head box, a trio line that is an uppermost pixel row that also contains pixels from the foreground portion followed by pixels from the background portion followed by pixels from the foreground portion;
identifying a crown box (a) whose leftmost, rightmost, and lowermost sides are the leftmost, rightmost, and lowermost sides of the head box, and (b) whose uppermost side is the trio line;
identifying, within the crown box, one or more pixels that (a) belong to the background portion and (b) change in luminescence more than a specified amount between the first image and the second image; and
recharacterizing each of the one or more pixels as belonging to the foreground portion rather than the background portion.

10. The method of claim 1, further comprising:
after recharacterizing the misidentified portions of the crown region as belonging to the foreground portion rather than the background portion, storing, on the storage device, a third image in which the background portion has been omitted from the scene.

11. A volatile or non-volatile computer-readable storage medium storing instructions which, when executed by one or more processors, cause the processors to perform steps comprising:
reading, from a storage device, a first image of a scene that was captured with a first amount of illumination;
reading, from the storage device, a second image of the scene that was captured with a second amount of illumination that differs from the first amount of illumination;
distinguishing a foreground portion of the scene from a background portion of the scene based on a comparison of the first image to the second image;
identifying, in the scene, a crown region that contains a crown of a person's head;
identifying portions of the crown region that have been misidentified as belonging to the background portion rather than the foreground portion; and
recharacterizing the misidentified portions of the crown region as belonging to the foreground portion rather than the background portion.

12. The computer-readable storage medium of claim 11, wherein identifying the crown region comprises:
identifying a primary foreground object by identifying a largest contiguous region of the foreground portion; and
recharacterizing all parts of the foreground portion that are external to the primary foreground object as belonging to the background portion rather than the foreground portion.

13. The computer-readable storage medium of claim 11, wherein identifying the crown region comprises:
identifying a largest contiguous region of the foreground portion; and determining whether the largest contiguous region contacts a bottom of a particular image that is either the first image or the second image;

in response to determining that the largest contiguous region does not contact the bottom of the particular image, identifying, within the foreground portion, as a primary foreground object, a next-largest contiguous region that (a) is not as large as the largest contiguous region and (b) contacts the bottom of the particular image; and recharacterizing all parts of the foreground portion that are external to the primary foreground object as belonging to the background portion rather than the foreground portion.

14. The computer-readable storage medium of claim 11, wherein identifying the crown region comprises:

identifying a sub-region of the background portion that is entirely surrounded by the foreground portion;

determining whether the sub-region contacts any portion of a rectangle that bounds an area that contains at least a part of the foreground portion; and in response to determining that the sub-region does not contact any portion of the rectangle, recharacterizing all parts of the sub-region as belonging to the foreground portion rather than the background portion.

15. The computer-readable storage medium of claim 11, wherein identifying the crown region comprises:

identifying a sub-region of the background portion that is entirely surrounded by the foreground portion;

determining whether the sub-region contacts any portion of a rectangle that bounds an area that contains at least a part of the foreground portion;

determining whether the sub-region occupies less than a specified percentage of a specified area; and in response to determining that (a) the sub-region does not contact any portion of the rectangle and (b) the sub-region occupies less than a specified percentage of the specified area, recharacterizing all parts of the sub-region as belonging to the foreground portion rather than the background portion.

16. The computer-readable storage medium of claim 11, wherein identifying the crown region comprises:

identifying a primary foreground object within the foreground portion based at least in part on the primary foreground object being a largest contiguous region of the foreground portion;

identifying a bounding rectangle whose sides contact uppermost, lowermost, leftmost, and rightmost extents of the primary foreground object; and identifying, within the bounding rectangle, a head box that is defined have (a) a width that is a specified fraction of a width of the bounding rectangle and (b) a height that is a specified fraction of a height of the bounding rectangle.

17. The computer-readable storage medium of claim 11, wherein identifying the crown region comprises:

identifying a primary foreground object within the foreground portion based at least in part on the primary foreground object being a largest contiguous region of the foreground portion;

identifying, based at least in part on a face-detection algorithm, a facial region of the primary foreground object; and identifying a head box whose edges contact uppermost, lowermost, leftmost, and rightmost extents of the facial region.

18. The computer-readable storage medium of claim 11, wherein identifying the crown region comprises:

identifying a head box that bounds the person's head;

locating, within the head box, a trio line that is an uppermost pixel row that also contains pixels from the foreground portion followed by pixels from the background portion followed by pixels from the foreground portion;

identifying a crown box (a) whose leftmost, rightmost, and lowermost sides are the leftmost, rightmost, and lowermost sides of the head box, and (b) whose uppermost side is the trio line;

identifying, within the crown box, one or more sub-regions that both (a) belong to the background portion and (b) do not touch any side of the crown box; and recharacterizing each of the one or more sub-regions as belonging to the foreground portion rather than the background portion.

19. The computer-readable storage medium of claim 11, wherein identifying the crown region comprises:

identifying a head box that bounds the person's head;

locating, within the head box, a trio line that is an uppermost pixel row that also contains pixels from the foreground portion followed by pixels from the background portion followed by pixels from the foreground portion;

identifying a crown box (a) whose leftmost, rightmost, and lowermost sides are the leftmost, rightmost, and lowermost sides of the head box, and (b) whose uppermost side is the trio line;

identifying, within the crown box, one or more pixels that (a) belong to the background portion and (b) change in luminescence more than a specified amount between the first image and the second image; and recharacterizing each of the one or more pixels as belonging to the foreground portion rather than the background portion.

20. The computer-readable storage medium of claim 11, wherein the steps further comprise:

after recharacterizing the misidentified portions of the crown region as belonging to the foreground portion rather than the background portion, storing, on the storage device, a third image in which the background portion has been omitted from the scene.

21. A digital camera comprising:

an image capture module that (a) captures a first image of a scene with a first amount of illumination and (b) captures a second image of the scene with a second amount of illumination that differs from the first amount of illumination;

a foreground identification module that distinguishes a foreground portion of the scene from a background portion of the scene based on a comparison of the first image to the second image; and a crown identification module that (a) identifies, in the scene, a crown region that contains a crown of a person's head, (b) identifies portions of the crown region that have been misidentified as belonging to the background portion rather than the foreground portion, and (c) recharacterizes the misidentified portions of the crown region as belonging to the foreground portion rather than the background portion.

22. The digital camera of claim 21, wherein identifying the crown region comprises:

identifying a largest contiguous region of the foreground portion; and determining whether the largest contiguous region contacts a bottom of a particular image that is either the first image or the second image;

in response to determining that the largest contiguous region does not contact the bottom of the particular image, identifying, within the foreground portion, as a primary foreground object, a next-largest contiguous region that (a) is not as large as the largest contiguous region and (b) contacts the bottom of the particular image; and recharacterizing all parts of the foreground portion that are external to the primary foreground object as belonging to the background portion rather than the foreground portion.

23. The digital camera of claim 21, wherein identifying the crown region comprises:
   identifying a sub-region of the background portion that is entirely surrounded by the foreground portion;
   determining whether the sub-region contacts any portion of a rectangle that bounds an area that contains at least a part of the foreground portion; and
   in response to determining that the sub-region does not contact any portion of the rectangle, recharacterizing all parts of the sub-region as belonging to the foreground portion rather than the background portion.

24. The digital camera of claim 21, wherein identifying the crown region comprises:
   identifying a sub-region of the background portion that is entirely surrounded by the foreground portion;
   determining whether the sub-region contacts any portion of a rectangle that bounds an area that contains at least a part of the foreground portion;
   determining whether the sub-region occupies less than a specified percentage of a specified area; and
   in response to determining that (a) the sub-region does not contact any portion of the rectangle and (b) the sub-region occupies less than a specified percentage of the specified area, recharacterizing all parts of the sub-region as belonging to the foreground portion rather than the background portion.

25. The digital camera of claim 21, wherein identifying the crown region comprises:
   identifying a primary foreground object within the foreground portion based at least in part on the primary foreground object being a largest contiguous region of the foreground portion;
   identifying a bounding rectangle whose sides contact uppermost, lowermost, leftmost, and rightmost extents of the primary foreground object; and
   identifying, within the bounding rectangle, a head box that is defined have (a) a width that is a specified fraction of a width of the bounding rectangle and (b) a height that is a specified fraction of a height of the bounding rectangle.

26. The digital camera of claim 21, wherein identifying the crown region comprises:

identifying a primary foreground object within the foreground portion based at least in part on the primary foreground object being a largest contiguous region of the foreground portion;
identifying, based at least in part on a face-detection algorithm, a facial region of the primary foreground object; and
identifying a head box whose edges contact uppermost, lowermost, leftmost, and rightmost extents of the facial region.

27. The digital camera of claim 21, wherein identifying the crown region comprises:
   identifying a head box that bounds the person's head;
   locating, within the head box, a trio line that is an uppermost pixel row that also contains pixels from the foreground portion followed by pixels from the background portion followed by pixels from the foreground portion;
   identifying a crown box (a) whose leftmost, rightmost, and lowermost sides are the leftmost, rightmost, and lowermost sides of the head box, and (b) whose uppermost side is the trio line;
   identifying, within the crown box, one or more sub-regions that both (a) belong to the background portion and (b) do not touch any side of the crown box; and
   recharacterizing each of the one or more sub-regions as belonging to the foreground portion rather than the background portion.

28. The digital camera of claim 21, wherein identifying the crown region comprises:
   identifying a head box that bounds the person's head;
   locating, within the head box, a trio line that is an uppermost pixel row that also contains pixels from the foreground portion followed by pixels from the background portion followed by pixels from the foreground portion;
   identifying a crown box (a) whose leftmost, rightmost, and lowermost sides are the leftmost, rightmost, and lowermost sides of the head box, and (b) whose uppermost side is the trio line;
   identifying, within the crown box, one or more pixels that (a) belong to the background portion and (b) change in luminescence more than a specified amount between the first image and the second image; and
   recharacterizing each of the one or more pixels as belonging to the foreground portion rather than the background portion.

29. The digital camera of claim 21, wherein the crown identification module, after recharacterizing the misidentified portions of the crown region as belonging to the foreground portion rather than the background portion, stores, on the storage device, a third image in which the background portion has been omitted from the scene.

* * * * *